United States Patent [19]
Kawai et al.

[11] Patent Number: 4,996,606
[45] Date of Patent: Feb. 26, 1991

[54] LIGHT EMITTING DEVICE AND ORIGINAL READING APPARATUS HAVING THE DEVICE

[75] Inventors: Tatsundo Kawai, Hiratsuka; Makoto Ogura, Yokohama; Koji Tomoda, Atsugi; Hiroo Ichihashi, Chigasaki; Shinichi Seitoh, Atsugi; Yasuo Kuroda, Sagamihara; Hiroyuki Noguchi, Yokohama, all of Japan

[73] Assignee: Canon Kabushiki Kaisha, Tokyo, Japan

[21] Appl. No.: 270,511

[22] Filed: Nov. 14, 1988

[30] Foreign Application Priority Data

Nov. 14, 1987 [JP] Japan .................. 62-288198
Dec. 28, 1987 [JP] Japan .................. 62-201506[U]
Dec. 28, 1987 [JP] Japan .................. 62-201507[U]
Dec. 28, 1987 [JP] Japan .................. 62-201508[U]
Dec. 28, 1987 [JP] Japan .................. 62-201509[U]
Dec. 29, 1987 [JP] Japan .................. 62-200536[U]

[51] Int. Cl.$^5$ .................. H01J 61/16; H01J 61/54; H04N 1/04
[52] U.S. Cl. .................. 358/475; 315/150; 315/248
[58] Field of Search .................. 358/475; 315/150, 248

[56] References Cited

U.S. PATENT DOCUMENTS 4,555,648 11/1985 Iida .................. 315/150
4,620,236 10/1986 Tanaka .................. 358/475
4,652,790 3/1987 Wood .................. 315/150
4,797,598 1/1989 Oikawa .................. 315/248
4,798,997 1/1989 Egami .................. 315/248

Primary Examiner—Howard W. Britton
Attorney, Agent, or Firm—Fitzpatrick, Cella, Harper & Scinto

[57] ABSTRACT

An image reading apparatus comprises a light emitting device for illuminating an original including information to be read; image sensor for inputting an optical information and converting it into an electric signal; and wherein the light emitting device has a xeron glow lamp and a light source which can illuminate a vicinity of a main electrode of the glow lamp.

33 Claims, 12 Drawing Sheets

LIGHT EMITTING DEVICE AND ORIGINAL READING APPARATUS HAVING THE DEVICE

BACKGROUND OF THE INVENTION

1. Field of the Invention

The present invention relates to a light emitting device having a xenon glow lamp and to an original reading apparatus having the device.

2. Related Background Art

When a document reader used typically in a document transmitter of a facsimile apparatus or the like is at rest or ready for reading a document, a light emitting device which is a source of document irradiation is generally off from a standpoint of lifetime, power consumption, and heat radiation of the light source.

The light emitting device is lighted after a switch for reading a document or a switch for transmission of a document is turned on, during or after communication for a receiver to which a document is to be transmitted for connection purposes, or immediately before reading a document starts. Thus reading a document starts.

Therefore, in a document reader of this type, the light emitting device is required to be excellent in immediate lighting and repetitive lighting. In order to read a document accurately at higher speed in a time lag-free manner, a light emitting device is needed which emits enough quantity of light, and performs stabilized light emission immediately after it is lighted, and even if it is required to continuously emit light for a long time. As a source of light emission of this type for document reading, a solid state light emitting element such as a light emitting diode, a white glow lamp such as a halogen lamp, and a discharge tube such as a fluorescent lamp are conventionally known.

Among others, discharge tubes including a source of cold light emits a small calorific power when continuously lighted are known, so that many of them satisfy requirements suitable for use as a light emitting device (a light source).

One of such, light emitting units is a xenon glow lamp.

FIG. 1 is a schematic of a xenon glow lamp.

In FIG. 1, a lamp 101 is filled with a xenon gas and emits light when a discharge occurs across main electrodes 102a and 102b. At start-up, first, a discharge occurs across an auxiliary electrode 103 and main electrode 102a and shifts rapidly to a discharge occurring across the main electrodes. The auxiliary electrode 103 serves to improve a rise in the discharge and stabilizes the discharge across the main electrodes.

However, if the conventional light emitting device is left in a state for a long time, the number of ions and electrons in the vicinity of the main electrode 102a is much reduced, the delay time required from application of a voltage to the tube to emission of lighting increases on average and fluctuates.

Since the light emitting device is placed in the black state when the document reader is placed on standby or at rest, such a time-lag and variations in the lighting of light emitting devices become a problem.

In order to solve this problem, a radio isotope could be deposited on the main electrodes. However, the use of the radioactive substances renders the manufacturing steps complicated and handling is not easy.

If a discharge tube having a high discharge starting voltage is used, a transformer is used which is required to have high dielectric strength in order to generate a high voltage corresponding to the discharge starting voltage. This renders the whole apparatus expensive and large-sized, so that it is necessary to perform a low voltage discharge in order to render the device inexpensive and small-sized.

SUMMARY OF THE INVENTION

In order to solve the above problems, it is an object of the present invention to provide a light emitting device which has an auxiliary light source in the vicinity of main electrodes of a xenon glow lamp in order to light the glow lamp rapidly.

According to the present invention, a rise characteristic for light emission is greatly improved with a simple structure without using special substances such as a radio isotope.

DETAILED DESCRIPTION OF THE PREFERRED EMBODIMENTS

A preferred embodiment of the present invention will now be described in more detail with reference to the drawings.

Figure 1:
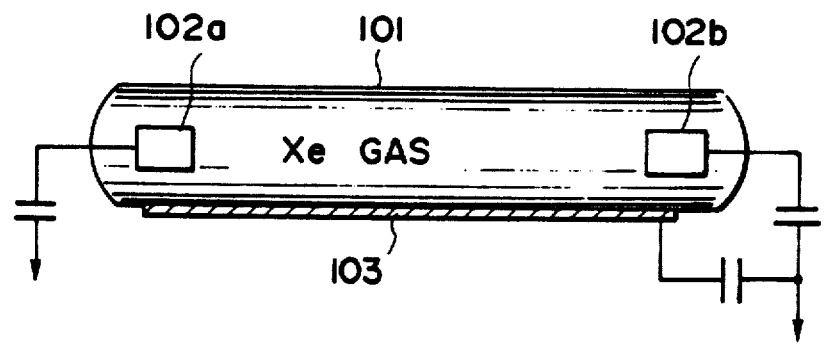
FIG. 1 shows a schematic structure of a xenon glow lamp.
Figure 2A:
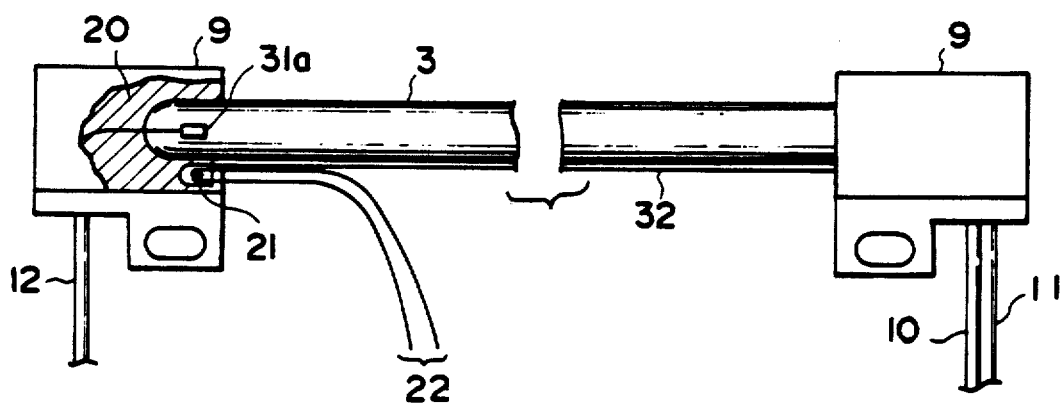
FIGS. 2(A), 2(B) and 5 show schematic structures illustrating a preferable embodiment of a light emitting device of the present invention.
Figure 2B:
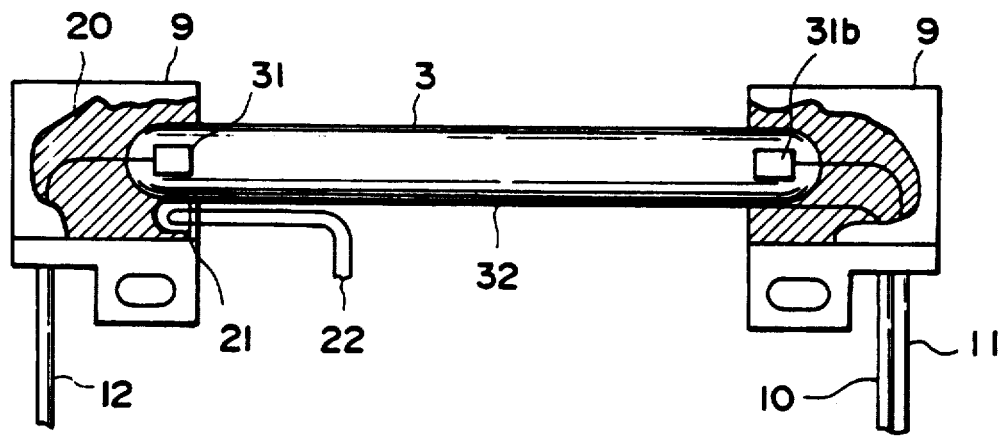

FIGS. 2(A) and (8) are schematic drawings of a preferred embodiment of a light emitting device according to the present invention.

In the Figures, a xenon glow lamp 3 is held at each end by a lamp holder 9. A pair of main electrodes 31a and 31b are provided at the corresponding ends of the lamp 3, and an auxiliary electrode 32 is provided on the side of the lamp in order to start a discharge rapidly. The electrodes 32 and 31a and 31b are connected to leads 10, 11 and 12.

A mini lamp 21 comprising a white glow lamp having a size of about 1–2 mm is embedded by an adhesive 20 in the lamp holder 9 and lighted through leads 22. The light emitted by the lamp 21 illumines the vicinity of the electrode 31a to produce ions and electrons to thereby cause a discharge immediately across the auxiliary electrodes 32 and the electrode 31a. Therefore, the time required for lighting the lamp 3 is shortened, as will be described in more detail later.

The mini lamp 21 may be fed with electrical energy simultaneously with the lamp 3.

The lighting of the xenon glow lamp and auxiliary lamp will be described in more detail later.

Figure 3:
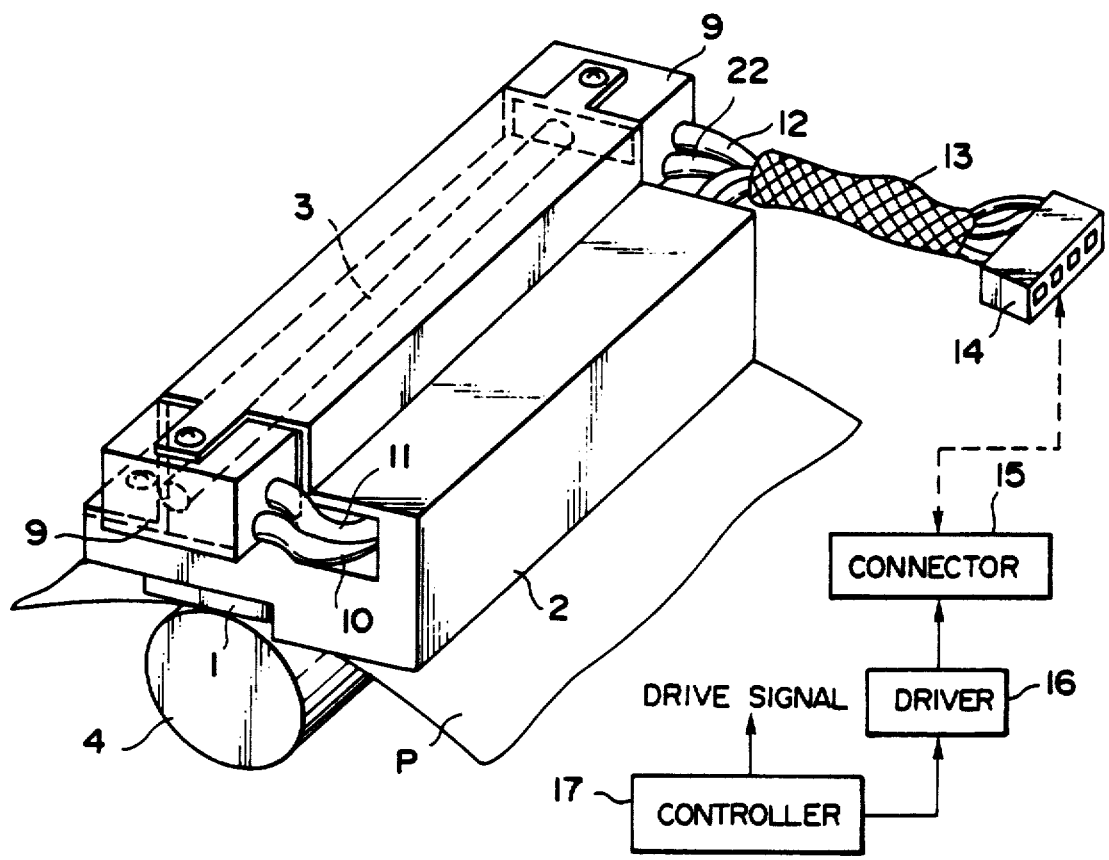
FIGS. 3 and 17 show schematic structures illustrating a reading system of an original reading apparatus.

FIG. 3 is a schematic used for explaining a reading system of a document reader using the present invention.

In FIG. 3, a line sensor 1 is fixed to a base 2, and a lamp holder 9 of a light emitting device of the present embodiment is fixed to the base 2 such that the xenon lamp 3 irradiates the line sensor 1 from its back side.

Leads 10, 11, 12 and 22 from the light emitting device are shielded by a shield 13 and connected to a connector 14.

A document P is pressed against the line sensor 1 by a roller 4 which rotates to move the document P in the sub-scanning direction to read the document.

Such reading operation is performed by the control of a controller 17 which also controls the lighting operation of the light emitting device. To this end, connectors 14 and 15 are connected such that the controller 17 controls a driver 16 to perform lighting control of the lamp 3 and mini lamp 21 of the light emitting device.

Figure 4:
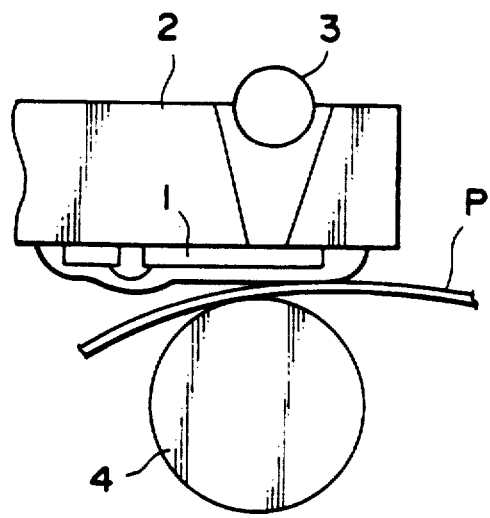
FIG. 4 shows a schematic structure of a sensor unit of an original reading apparatus.

FIG. 4 is a schematic of the sensor section of the document reader.

In FIG. 4, a document P is put in contact with the sensor 1 by roller 4. All light from the lamp 3 illumines the face of the document P on the back side of the sensor 1. The reflection from the document is entered into the photoelectric conversion section of the sensor 1 to thereby convert an image on the document to an electrical signal.

The light source which illumines the vicinity of the main electrode 31 may include the mini lamp 21 or a light emitting diode (LED) to be described later in more detail. Any light source is preferably positioned such that the main flux from the light source strikes the main electrode 31.

Figure 5:
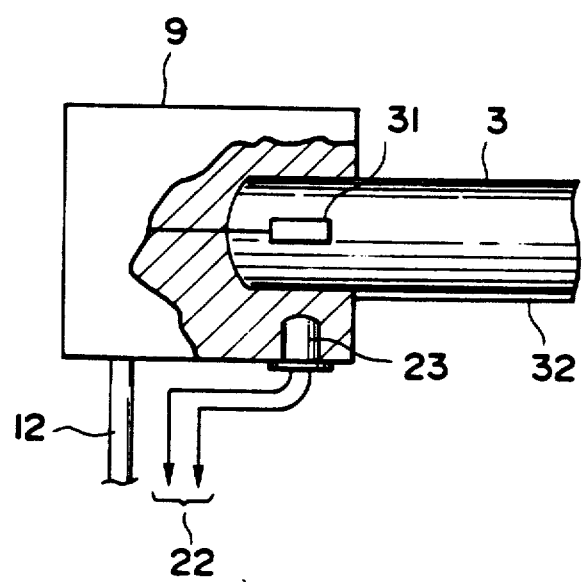

FIG. 5 is a schematic of an embodiment of the present invention in which a LED is used as the auxiliary light source.

In the particular embodiment. LED is embedded as a light source in the lamp holder 9 such that the light from LED illumines the main electrode 31. The characteristic, etc., obtained by the use of LED are given as follows.

Figure 6:
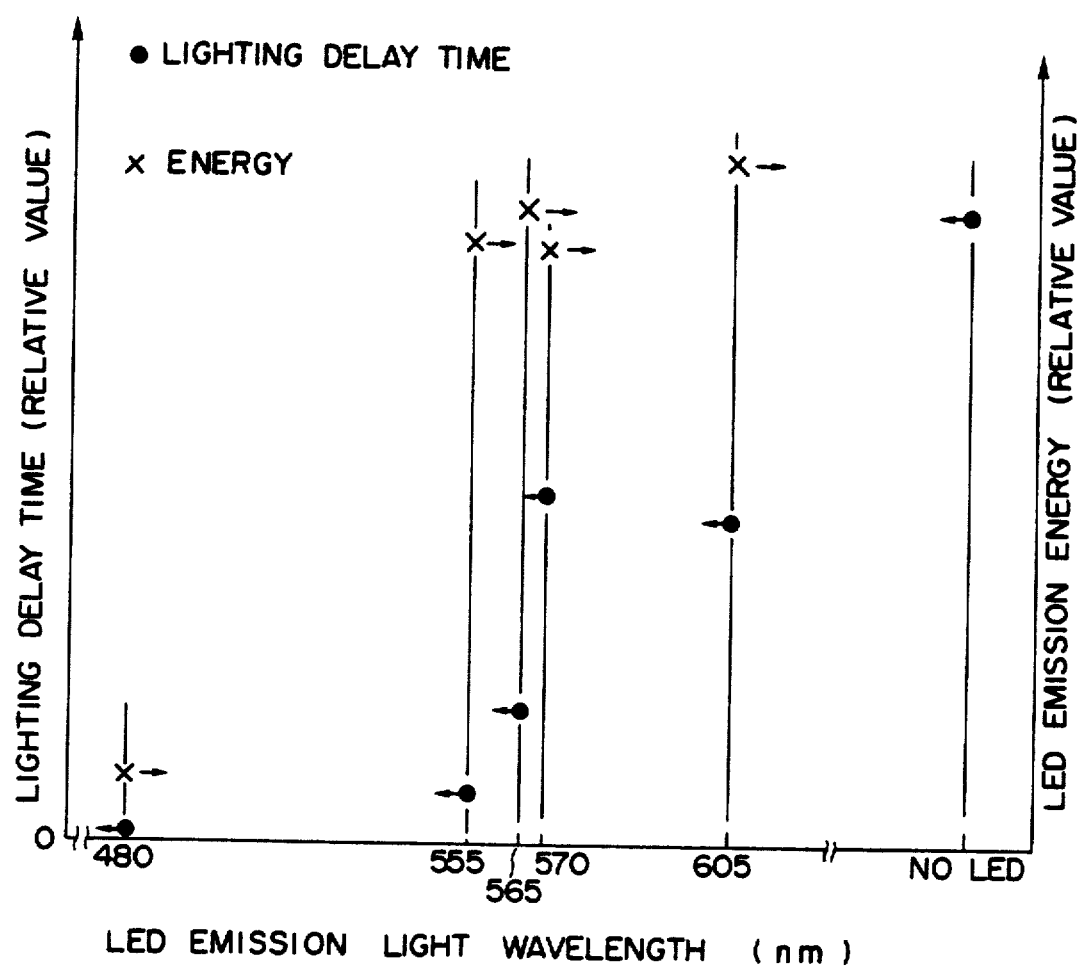
FIG. 6 is a view illustrating a lighting delay of a xenon glow lamp.

FIG. 6 is a graph of the dependency of a lighting delay time of a xenon glow lamp 3 on the wavelength of light emitted by LED.

As shown in the same graph, the radiant energy from LED in wavelength $\lambda = 555-605$ nm are substantially the same whereas the lighting delay time are reduced as the wavelength $\lambda$ becomes shorter. At a wavelength $\lambda = 480$ nm, the radiant energy is low while the lighting delay time is further reduced. Therefore, it will be seen that a shorter wavelength of the light emitted by LED is more advantageous. Even a wavelength of about 605 nm is sufficiently effective compared to a xenon glow lamp using no LED. From a practical standpoint, a LED which emits light having a wavelength $\lambda = 555$ nm or so is preferred.

Figure 7:
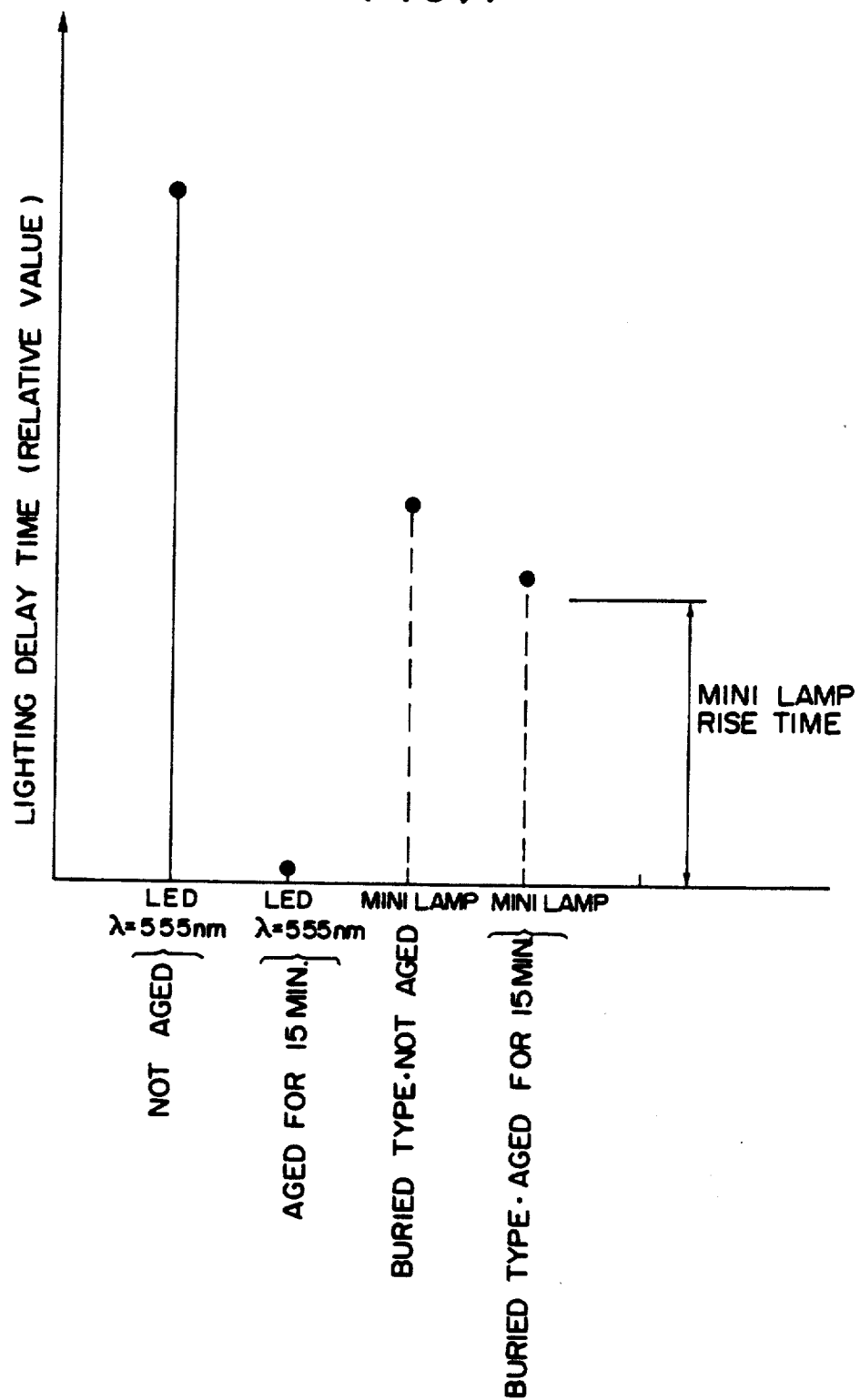
FIG. 7 illustrates an aging effect of a xenon glow lamp.

FIG. 7 is a graph showing the aging effect of a xenon glow lamp.

As shown in the same Figure, the 15 minute aging in LED irradiation greatly reduces the lighting delay time. The aging effect is recognized also in a mini lamp embedded in lamp holder 9, but the mini lamp itself has a significant rise time, so that the aging effect is low compared to LED.

However, since the mini lamp produces greatly large radiant energy compared to LED, the variations in the lighting delay time due to variations in the xenon glow lamp structure are reduced to thereby provide a stabilized characteristic. The lighting delay time caused by a rise time of the mini lamp is relatively short and is of high reproducibility, so that it can be solved by slightly shifting the reading timing in the device. Therefore, the delay time does not virtually become a practical problem in the document reader or the like.

Figure 8:
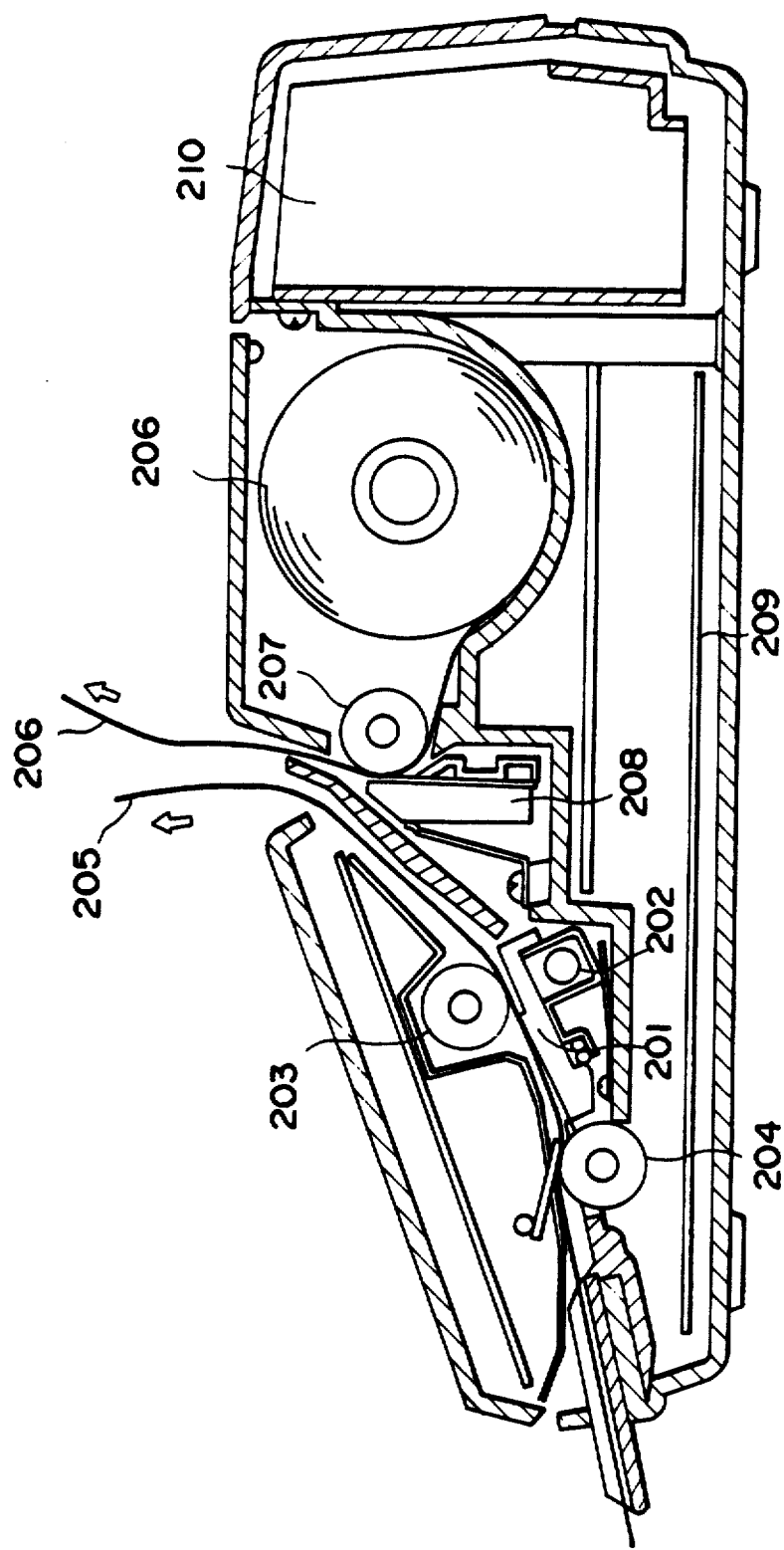
FIG. 8 shows a schematic structure of a facsimile machine using the present invention.

FIG. 8 is a schematic of a facsimile device using the present embodiment.

In FIG. 8, at document transmission, a document 205 is pressed against a contact type image sensor 201 by a platen roller 203 and moved in the direction of the arrow by the platen roller 203 and a feed roller 204. The document face is illumined by the xenon lamp 202 which functions as a light source, and the light reflected by the document is entered into the sensor 201 and converted to an electrical signal corresponding to information on the image on the document for transmission purposes.

At reception, recording paper 206 is carried by a platen roller 207 and an image is reproduced by a thermal head 208, corresponding to the received signal.

The whole apparatus is controlled by a controller on a system control base 209 and the respective drive systems and circuits are fed with electric power from a power source 210.

By applying to such a device the light emitting device of the particular embodiment, a high-speed stabilized operation is ensured.

The lighting and extinction of the light emitting device according to the present invention will be described with reference to the drawings.

Figure 9A:
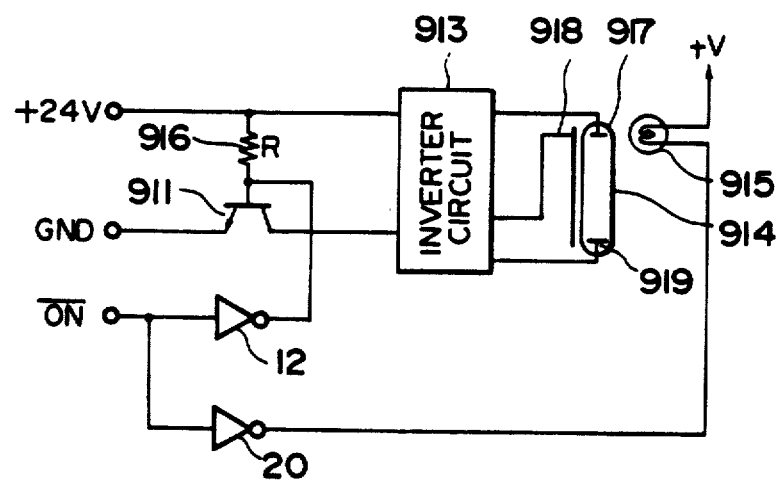
FIGS. 9A, 9B, 10, 11, 13, 15, and 18 are schematic circuit diagrams illustrating preferable examples of circuits of the light emitting device of the present invention.

FIGS. 9(A) and (B) schematically illustrate one example of a lighting circuit of a light emitting device according to one embodiment of the present invention. The operation of the light emitting device will now be described.

An $\overline{ON}$ signal is used to command the lighting and extinction of a lamp. When the signal is at zero level, the output of an open collector circuit 912 is opened and a transistor 911 as a switch is turned on because an electric current flows through a resistor 916 to the base of the transistor.

This causes an inverter circuit 913 to start to produce a high voltage signal having a high frequency to cause a xenon lamp 914 to emit light provided at the subsequent stage to the inverter 913. Thus the high voltage signal is applied across the main electrodes 917 and 919 and the auxiliary electrode 918 of the lamp 914 to thereby establish the conditions by which glow discharge starts.

However, there is a physical distance between the electrodes 917 and 918, so that discharge does not start unless a voltage is produced which is high enough to allow discharge across the distance. In order to generate such a high voltage, the dielectric strength performance of the transformer concerned must also be improved, which is a hindrance to miniaturization of the parts of the device.

One of methods to solve these problems is to provide a white glow lamp 915 in the vicinity of the auxiliary electrode 917 in the particular embodiment.

Figure 9B:
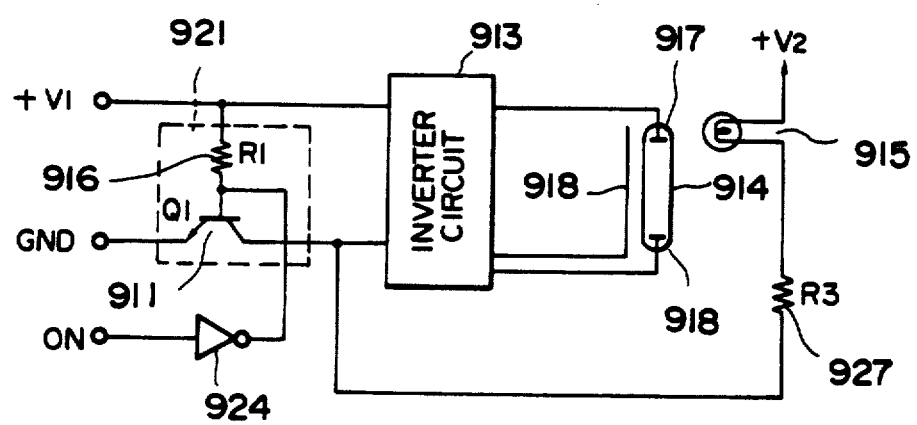
Figure 9C:
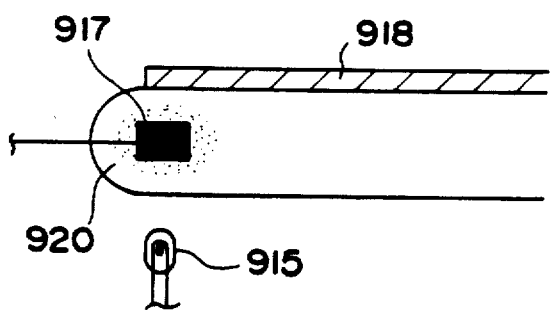
FIG. 9C illustrates a principle of the present invention.

The principle of lighting according to this method will now be outlined now. The electrode 917 is coated with a metal oxide such as BaO having a low work function. If photons emitted by the auxiliary lamp 915 lighted in accordance with the $\overline{ON}$ signal strike the metal oxide coating, electrons are separated from the molecules of Ba and float in the space 920 in the vicinity the electrode. If high voltage is applied across the auxiliary electrode 918 and main electrode 917 under such conditions to thereby establish an electric field thereacross, the floating electrons are moved by the electric field, so that a glow discharge starts across the electrodes 917 and 918 (FIG. 9(B)).

If the inter-electrode current is increased gradually under such conditions, the discharge bearing area increases such that the density of the charge stored in the stray capacitance present between the auxiliary electrode 918 and the main electrodes 917 and 919 becomes constant, and finally, discharge starts across the main electrodes 917 and 919, thereby resulting in a so-called "lighting".

In the same Figure, however, first, the transistor 911 and inverter 920 become a switch, but the reliability of the circuit may be lowered because of the use of a plurality of switches. Second, the use of the plurality of switches may increase the device cost. Third, since recent devices such as facsimile devices have a compacted structure, and its printed circuit board on which electrical parts are mounted is miniaturized, the the mounting space is reduced. Such structure may bring about failure due to space saving.

Figure 10:
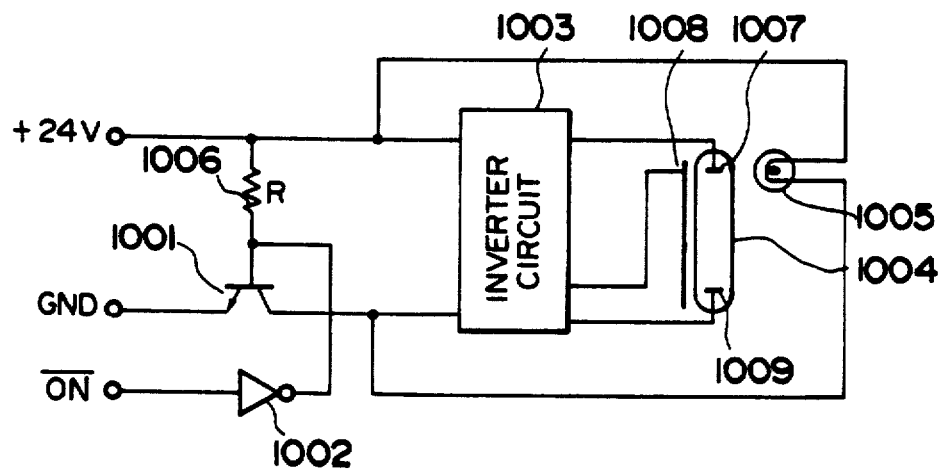

FIG. 10 illustrates a further preferred structure of a lighting and extinguishing circuit for the light emitting device according to the present invention.

In FIG. 10, the $\overline{ON}$ signal denotes a signal which controls the lighting and extinguishing of a xenon lamp 1004. If the signal becomes "1", the lamp 1004 is extinguished while if the signal becomes "0", the output from inverter 1002 is opened so that an electrical current flows into the base of a transistor 1001 via a resistor 1006 to thereby turn on the transistor 1001 as the switch circuit. This causes a high voltage signal having high frequency to occur on the secondary side of an inverter 1003 at the subsequent stage to the transistor 1001. The high voltage signal is applied across the auxiliary and main electrodes 1008 and 1007 and across the main electrodes 1007 and 1009.

By turning on the transistor 1011, an electric current flows also through an auxiliary lamp 1005 to thereby light the lamp 1005 to also light the xenon lamp 1004 on the basis of the principle mentioned above.

As described above, according to the particular embodiment, both the xenon lamp and the auxiliary lamp are lighted by a single semiconductor switch, so that the possibility that the problems with the conventional switch circuit will occur is eliminated. The auxiliary lamp 915 acts as a kind of trigger to start to light the xenon lamp 914. The auxiliary lamp 915 tarts to be lighted simultaneously with the starting of the operation of the inverter 913.

However, when the lamp 915 employs a filament of tungsten, a rush current exceeding a rated current flows through the filament before the filament temperature rises at the beginning of lighting, which may cause a failure. In order to cope with such failure, an ordinary resistor 927 may be provided in the path of the electric current flowing through the lamp 915 to limit the rush current. Since this method limits the current flowing the through the lamp 915, it must be used in the environment where the brightness is low and may be insufficient on occasion.

The electric current to be limited is determined experimentally in consideration of a rise time in the lighting of the xenon lamp 914. In this respect, it is presumed that the xenon lamp 914 may not be lighted because of a decrease in the quantity of light emitted by the auxiliary lamp 915 due to aging and fluctuations in the characteristic of the xenon lamp 914 itself.

Another preferred embodiment of the light emitting device according to the present invention will now be described with reference to FIG. 11. FIG. 12 illustrates the lighting timing for a lamp 1107.

The signal $\overline{ON}$ is a command to light a xenon lamp. When the signal is "1", the lamp is off while when the signal is "0", the lamp is lighted. When the signal $\overline{ON}$ becomes "0", the switch circuit 1101 is turned on by an inverter 1108 so that a high frequency voltage is applied to an auxiliary electrode 1106 and main electrodes 1104 and 1105 by an inverter 1102 to thereby light a xenon lamp 1103.

Figure 11:
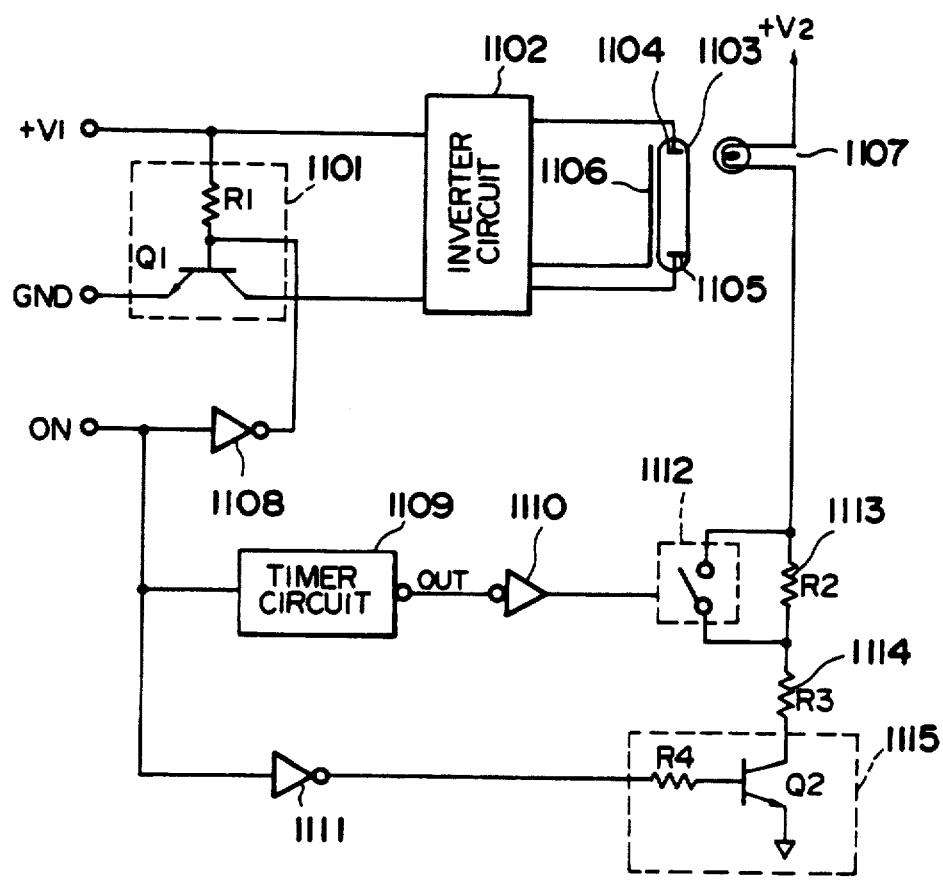
Figure 12:
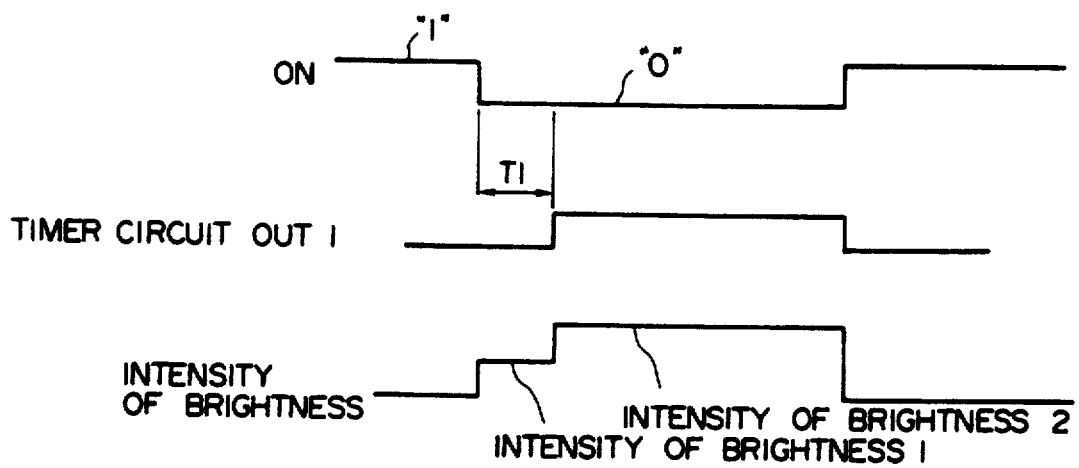
FIG. 12 shows a timing chart illustrating a lighting timing and intensity of a light source of the present invention.

A timer circuit 1109 shown in FIG. 11 generates a signal T1 for a predetermined time, so that a switch circuit 1115 is turned on by an inverter 1111 during the time T1 after the signal $\overline{ON}$ has become "0". Therefore, a xenon glow lamp 1103 is lighted and an electric current limited by resistors R2 and R3 flows through a rise compensating lamp 1107. The brightness of lamp 1107 at this time is represented by L1.

When T1 has passed, a switch contact 1112 of a photorelay circuit 1112 is closed, so that an electric current limited only by R3 flows through lamp 1107. Therefore, this current is high so that the lamp 1107 has a brightness L2 greater than L1 to thereby ensure the lighting of glow lamp 1103.

According to this embodiment, as mentioned above, when a rush current flows, a small electric current will light lamp 1107, and a large current flows when the filament resistance becomes sufficiently large, which eliminates the probability of occurrence the problems with of conventional lighting system. Namely, the fusing away of the filament due to a rush current flowing into a tungsten filament lamp is prevented and the effect provided by the use of the lamp is sufficiently exhibited.

A further preferred embodiment of the present invention will now be described.

Figure 13:
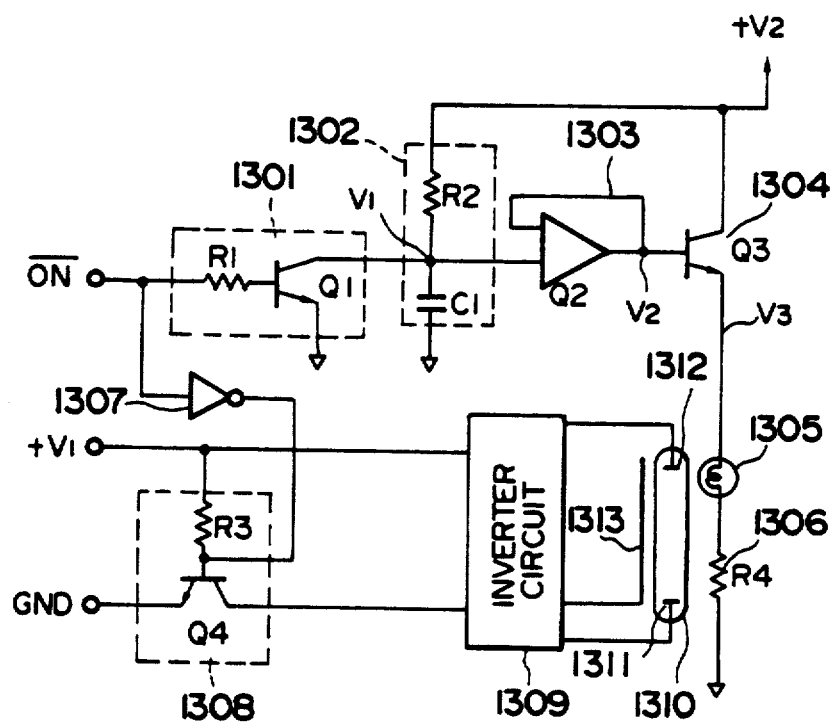
Figure 14:
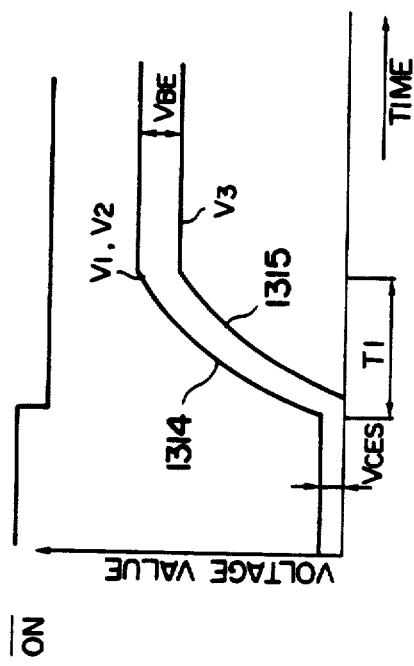
FIG. 14 shows a voltage charging of a circuit as shown in FIG. 13.

FIG. 13 is a schematic of a lighting device of a xenon lamp to which the present invention is applied. FIG. 14 illustrates changes in the main voltages V1, V2 and V3 with time for generating a voltage applied to the rise compensating lamp 1305 in the circuit of FIG. 13.

In FIG. 14, $V_{CES}$ denotes a saturation voltage across the collector and emitter of a transistor Q1 and $V_{BE}$ a voltage across the base and emitter of a transistor Q3.

The operation of the device of FIG. 13 will now be described. The signal $\overline{ON}$ is a control signal to light and extinguish a xenon lamp 1310. When the signal becomes "0", the timing with which the lamp is lighted starts, but, the falling edge of the signal does not light the lamp for the reason mentioned above.

When the signal $\overline{ON}$ becomes "0", the output from inverter 1307 is opened and switch 1308 is turned on. This causes a high frequency voltage to be applied from inverter 1309 to auxiliary electrode 1313, main electrodes 1311 and 1312 to thereby enable xenon lamp 1310 to be lighted.

When the signal $\overline{ON}$ becomes "0", switch circuit 1301 becomes off, a capacitor Cl of a time constant circuit 1302 starts to charge thereby to increase the charged potential as shown by V1 in FIG. 14. The charged potential of the time constant circuit capacitor Cl is applied to an impedance conversion circuit 1303, the output from which causes the base potential of transistor Q3 to increase gradually.

The quantity of voltage applied to auxiliary lamp 1305 is controlled by the time constant circuit 1302 constituted by resistor R2 and capacitor Cl as shown by area T1 in FIG. 14.

At this time, the voltage shown by V3 in FIG. 14 is applied across lamp 1305 and the $\overline{ON}$ signal increasing gradually from "0" is applied across the filament of lamp 1305.

The appropriate level of V3 is determined by selection of the resistor R4 value which may be determined by the specification of a time at which lighting starts, required by a system in which xenon lamp 1310 is used.

In the particular embodiment, no rush current flows through the filament, so that the problem in which the lamp would otherwise fail due to a rush current in the prior art is eliminated.

According to a method in which a kind of a triggering action is performed using a white glow type mini lamp which employs a tungsten filament, several hundreds of milliwatts of power are required experimentally, long time lighting of the white glow lamp produces a large heating value, so that the holder positioned in the vicinity of the lamp must be made of high heat-proof material, which leads to cost increase.

The tungsten filament is used as a light source, so that there may arise the problem that the lifetime of the xenon lamp would be substantially not larger than that of mini lamp 1506 if the mini lamp is not replaceble.

A preferred embodiment of the preesnt invention which eliminates this problem will now be described with reference to the drawings.

Figure 15:
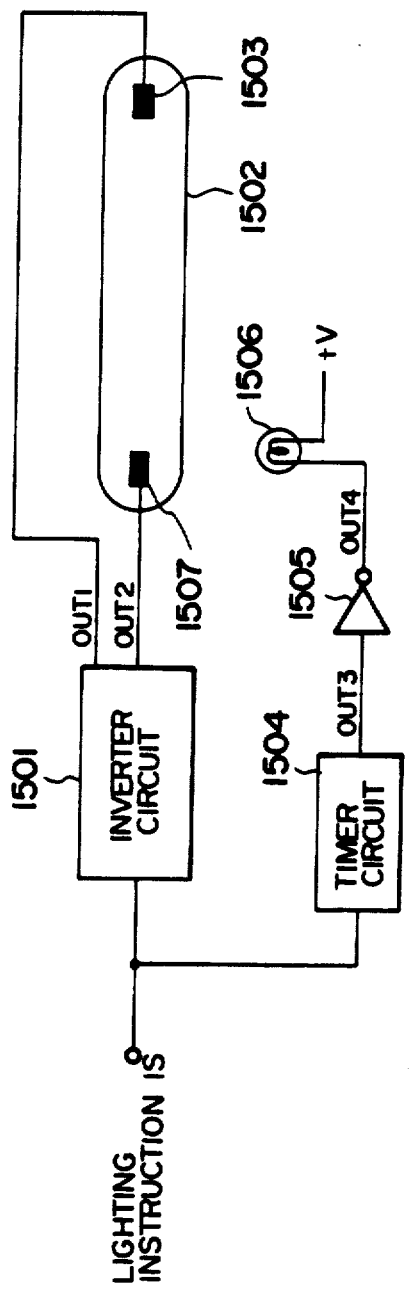
Figure 16:
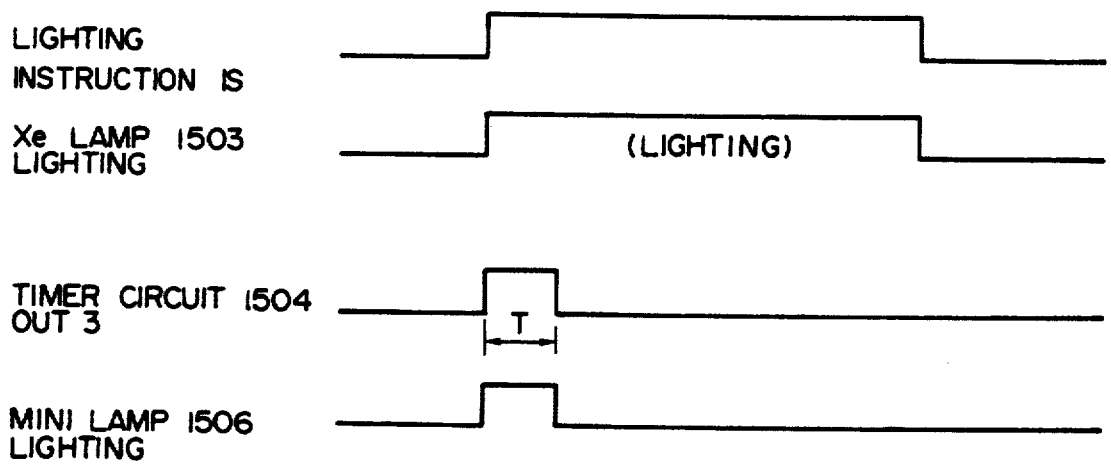
FIGS. 16 and 19 show timing charts illustrating a lighting timing of the light source of the present invention.
Figure 17:
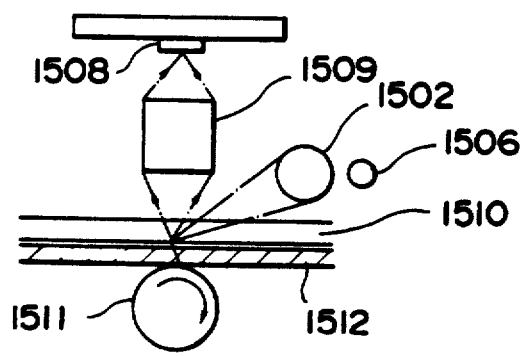

FIG. 15 is a schematic of a xenon lamp lighting circuit as an embodiment of the present invention. FIG. 16 shows the lighting and extinguishing timing for the xenon lamp. FIG. 17 is a schematic of a document reader to which the present inveniton is applied.

In the same Figures, a lighting instruction IS controls the turning on and off of xenon lamp 1502.

As shown in FIG. 16, if lighting instruction IS is issued, xenon lamp 1502 performs glow discharge across its electrodes 1507 and 1503 through inverter 1501 to thereby continue lighting. A mini lamp 1506 provided in the vicinity of the main electrode 1507 is used to accelerate the generation of ions and electrons. It is lighted by a lamp driver 1505 in accordance with an output signal OUT 3 produced by a timer 1504 only during a predetermined time interval of T. The time interval T is determined experimentally on the basis of data on stabilized lighting of xenon lamp 1502. According to our data, lighting for an interval of several hundreds of milliseconds brought about a satisfactory result.

When xenon lamp 1502 is used as a light source for reading a document in a facsimile device such as that shown in FIG. 17, the time during which the lamp 1505 is lighted amounts to at least a dozen seconds. In contrast, several hudreds of milliseconds of mini lamp 1506 lighting is very short compared to that the lamp 1502.

In FIG. 17, reference numerals 1508, 1509, 1510, 1511 and 1512 denote an image sensor such as CCD, a lens, a document fixing glass, a document carrying roller and a document, respectively.

As just described, the mini lamp 1506 for compensating for a lighting rise of the xenon lamp is lighted for only a predetermined time at the beginning of the lighting, and the mini lamp 1506 is extinguished before the xenon lamp 1502 is turned off, so that the inconvenience caused by heating of the mini lamp 1506 is eliminated.

As described above, according to the particular embodiment, the lighting time of the rise compensating lamp is shortened compared to the xenon lamp, so that the problems of lifetime and heat emission caused by the same lighting time of the xenon lamp and auxiliary lamp are eliminated.

A further preferred embodiment of the present invention will now be described with reference to the drawings.

Figure 18:
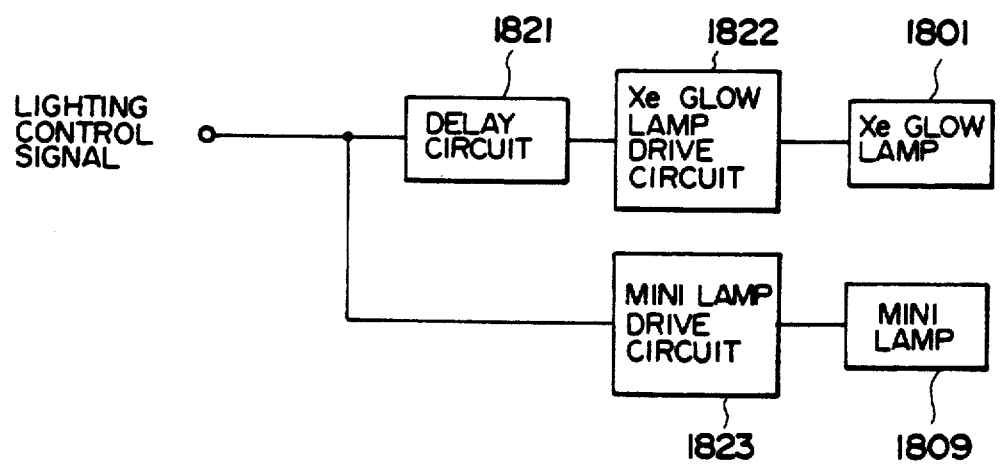
Figure 19:
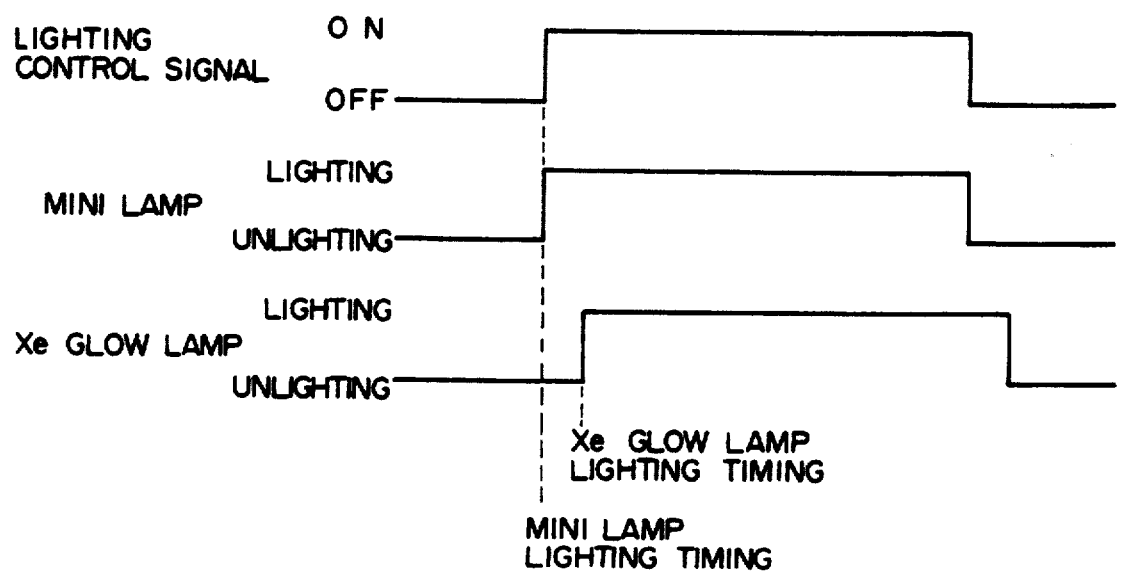

FIG. 18 is block diagram of an embodiment of the light emitting device according to the present invention. FIG. 19 is a timing chart for the light emitting device.

In FIG. 18, a lighting control signal is applied to lights a xenon glow lamp 1801 and a mini lamp 1809 which compensates for the rise of the lighting of the xenon glow lamp through a delay circuit 1821 and a xenon glow lamp drive circuit 1822 and through a mini lamp drive circuit 1823, respectively.

The operation of this embodiment will be described with reference to FIG. 19. When the lighting control signal is turned on, the mini lamp 1809 is lighted with the same timing as the lighting control signal whereas xenon glow lamp 180 is lighted delayed by a delay time determined by the delay circuit 1821.

Thus since the mini lamp 1809 is lighted earlier than xenon glow lamp 1802, the lighting rise time of the mini lamp itself is negligible to thereby improve the lighting rise characteristic of xenon glow lamp 1801.

When the particular light emitting device is used as a document reading light source, reading may be started after a lapse of a delay time determined by the delay circuit since the lighting control signal is turned on, namely, with the timing at which the xenon glow lamp is lighted.

Alternatively, a similar effect may be obtained by using an alternative preferred circuit in which a xenon glow lamp and a mini lamp are driven by lighting control signals through the corresponding drive circuits such that the mini lamp is lighted earlier than the other lamp without using any delay circuit.

If the delay time provided by the delay circuit is set so as to be varied depending on the length of the "left" time, the mini lamp can be used efficiently to thereby prolong the lifetime of the mini lamp.

As described above, with a light emitting device which has an auxiliary light source separated from a xenon lamp which emits light utilizing a discharge, the lighting rise characteristic of the lamp is greatly improved by lighting the light source earlier than the lamp.

We claim:
1. An image reading apparatus comprising:
 a light emitting device for illuminating an original, said light emitting device having a xenon glow lamp and a light source for illuminating a vicinity of a main electrode of the glow lamp;

an image sensor for converting optical information from the original into an electric signal;

a controller for controlling an operation of reading an image of the original; and a driver for driving the xenon glow lamp and the light source, said driver being operated by said controller.

2. An apparatus of claim 1, wherein said light source comprises fixed within a holder holding said lamp.

3. An apparatus of claim 1, wherein said light source is an incandescent lamp.

4. An apparatus of claim 1, wherein said light source comprises a light emitting diode.

5. An apparatus of claim 1, wherein said light source emits an electromagnetic wave having a wave length less than 605 nm.

6. An apparatus of claim 1, wherein said driver includes a circuit for controlling said xenon lamp and said light source so that a lighting timing of said light source is before a lighting timing of said xenon lamp.

7. An apparatus of claim 1, wherein said driver includes a circuit for applying a voltage to an electrode of said xenon glow lamp, and simultaneously applying gradually increasing voltage to said light source.

8. An apparatus of claim 1, wherein said driver includes a circuit for lighting said light source at a first brightness for a desired time period, and for lighting it at a second brightness after the desired time period.

9. An apparatus of claim 1, wherein said driver includes a circuit for simultaneously applying a voltage to said xenon glow lamp and to said light source, and for putting out said light source before said xenon glow lamp.

10. An apparatus of claim 1, wherein said driver includes a semiconductor switch provided at a primary circuit in a starting circuit of said xenon glow lamp, for turning on and off said light source according to an on and off operation of said switch.

11. An apparatus of claim 1, wherein said xenon glow lamp has a auxiliary electrode provided between the main electrodes.

12. An apparatus of claim 1, wherein a plurality of said light sources are provided.

13. An apparatus of claim 1, wherein at least a portion of lead wiring relating to said light emitting device is electromagnetically shielded.

14. An apparatus of claim 1, wherein said light source is arranged so that a main light flux of the light source is incident on the main electrode of said xenon glow lamp.

15. An apparatus of claim 1, wherein said driver puts out the light source before the xenon glow lamp.

16. An apparatus of claim 1, wherein said driver includes a circuit for gradually increasing voltage to the light source.

17. An apparatus of claim 1, further comprising means for transporting said original into a reading position.

18. An apparatus of claim 17, further comprising means for transmitting an electric signal corresponding to the image information of the original.

19. An apparatus of claim 1, further comprising means for transporting said original into a reading portion, and means for recording the image.

20. An apparatus of claim 19, further comprising means for transmitting an electric signal corresponding to image information of the original.

21. A light emitting device comprising:

a xenon glow lamp; and a light source arranged so as to illuminate a vicinity of a main electrode of said xenon glow lamp so that a main light flux of said light source is incident on the main electrode.

22. A device of claim 21, wherein said light source has a light timing before a light timing of said xenon glow lamp.

23. A device of claim 21, further comprising a semiconductor switch, provided at a primary circuit in an inverter starting circuit of said xenon glow lamp, for turning on and off said xenon glow lamp and said light source by on and off operation of said switch.

24. A device of claim 21, wherein said switch, simultaneously with applying a voltage to an electrode of said xenon glow lamp for lighting, applies a gradually increasing voltage to said auxiliary light source.

25. A device of claim 21, wherein said switch turns off said light source before said zenon glow lamp.

26. A device of claim 21, wherein said light source has at least two lighting states providing first and second brightnesses respectively.

27. A device of claim 21, wherein said light source is fixed within a border holding said xenon glow lamp.

28. A device of claim 27, wherein said light source comprises an incandescent lamp.

29. A device of claim 27, wherein said light source comprises a light emitting diode.

30. A method for driving a light emitting device provided with a xenon glow lamp and a light source capable of illuminating at least a vicinity of a main electrode of the xenon glow lamp, comprising the step of simultaneously applying a voltage between electrodes of the xenon glow lamp, and a voltage to the light source.

31. A method of claim 30, wherein the voltage applied to the light source is gradually increased during a time of its application.

32. A method of claim 30, wherein the voltage to be applied to the light source has, upon its applications, a level lower than a level just before an end of its application.

33. A method of claim 30, wherein an end of the voltage application to the light source is before an end of the voltage application to the xenon glow lamp.

* * * * *

UNITED STATES PATENT AND TRADEMARK OFFICE
CERTIFICATE OF CORRECTION

PATENT NO. : 4,996,606           Page 1 of 3
DATED     : February 26, 1991
INVENTOR(S) : Kawai, et al.

It is certified that error appears in the above-identified patent and that said Letters Patent is hereby corrected as shown below:

TITLE PAGE:

[30] Foreign Application Priority Data

Insert --Nov. 11, 1988 [JP]  Japan ........ 63-283998-- between Dec. 29, 1987 [JP] Japan ....... 62-200536 [U] and
[51] Int. Cl.$^5$ ....... H01J 61/16; H01J 61/54;.

[57] ABSTRACT

Line 3, "image sensor" should read --an image sensor--; and "an" should be deleted; and
    Line 5, "xeron" should read --xenon--.

COLUMN 1:

Line 30, "time.  As" should read --time.  New Paragraph As--;
    Line 37, "lights emits" should read --light which emits--;
    Line 41, "such," should read --such--; and
    Line 53, "a state" should read --a black state--.

COLUMN 2:

Line 55, "(8)" should read --(B)--.

COLUMN 4:

Line 7, "greatly large" should read --a great amount of--.

UNITED STATES PATENT AND TRADEMARK OFFICE
CERTIFICATE OF CORRECTION

PATENT NO. : 4,996,606  
DATED : February 26, 1991  
INVENTOR(S) : Kawai, et al.

Page 2 of 3

It is certified that error appears in the above-identified patent and that said Letters Patent is hereby corrected as shown below:

COLUMN 5

Line 5, "outlined now." should read --outlined.--;  
Line 32, "the the" should read --the--;  
Line 51, "transistor 1011," should read --transistor 1001,--; and  
Line 61, "tarts" should read --starts--.

COLUMN 6

Line 35, delete "1112";  
Line 44, "occurrence" should read --occurrence of--; and  
Line 45, "of" should read --the--.

COLUMN 7

Line 38, "replaceble," should read --replaceable.--;  
Line 39, "preesnt" should read --present.--;  
Line 65, "lamp 1505" should read --lamp 1502--; and  
Line 68, "that the" should read --that of the--.

COLUMN 8

Line 25, "lights" should read --light--;  
Line 34, "xenon glow lamp 180" should read --xenon glow lamp 1801--; and  
Line 37, "xenon glow lamp 1802," should read --xenon glow lamp 1801,--.

COLUMN 9:

Line 9, "comprises" should read --is--;  
Line 11, "is" should read --comprises--; and  
Line 43, "a" should read --an--.

UNITED STATES PATENT AND TRADEMARK OFFICE
CERTIFICATE OF CORRECTION

PATENT NO. : 4,996,606

DATED : February 26, 1991

INVENTOR(S) : Kawai, et al.

It is certified that error appears in the above-identified patent and that said Letters Patent is hereby corrected as shown below:

COLUMN 10:

Line 32, "zenon" should read --xenon--;
    Line 37, "border" should read --holder--; and
    Line 53, "applications," should read --application,--.

Signed and Sealed this

Thirteenth Day of April, 1993

Attest:

STEPHEN G. KUNIN

Attesting Officer      Acting Commissioner of Patents and Trademarks